United States Patent
Beers et al.

(10) Patent No.: US 9,873,515 B2
(45) Date of Patent: Jan. 23, 2018

(54) TURBINE NOZZLE WITH RELIEF CUT

(71) Applicant: Hamilton Sundstrand Corporation, Windsor Locks, CT (US)

(72) Inventors: Craig M. Beers, Wethersfield, CT (US); Darryl A. Colson, West Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 574 days.

(21) Appl. No.: 14/458,306

(22) Filed: Aug. 13, 2014

(65) Prior Publication Data

US 2016/0047358 A1    Feb. 18, 2016

(51) Int. Cl.
| | | |
|---|---|---|
| *B64D 13/06* | (2006.01) | |
| *F04D 17/02* | (2006.01) | |
| *F01D 1/06* | (2006.01) | |
| *F02C 7/32* | (2006.01) | |
| *F01D 9/04* | (2006.01) | |
| *F02C 3/05* | (2006.01) | |

(52) U.S. Cl.
CPC ............... *B64D 13/06* (2013.01); *F01D 1/06* (2013.01); *F01D 9/048* (2013.01); *F02C 3/05* (2013.01); *F02C 7/32* (2013.01); *F04D 17/025* (2013.01); *F05D 2250/29* (2013.01)

(58) Field of Classification Search
CPC ...... F02C 3/05; F02C 7/32; F01D 1/06; F01D 9/048; F04D 17/025
See application file for complete search history.

(56) References Cited

U.S. PATENT DOCUMENTS

| | | | | |
|---|---|---|---|---|
| 4,355,953 | A  * | 10/1982 | Nelson | F03B 3/183 |
| | | | | 415/164 |
| 4,726,744 | A  * | 2/1988 | Arnold | F01D 17/165 |
| | | | | 415/164 |
| 8,475,114 | B2 | 7/2013 | Rosen et al. | |
| 8,529,210 | B2 | 9/2013 | Merritt et al. | |
| 8,596,967 | B2 | 12/2013 | Rosen et al. | |
| 9,103,213 | B2 * | 8/2015 | Barr | F01D 5/143 |
| 2005/0005603 | A1 * | 1/2005 | Stilgenbauer | F01D 17/165 |
| | | | | 60/602 |
| 2007/0068155 | A1 * | 3/2007 | Hayashi | F01D 17/165 |
| | | | | 60/602 |
| 2010/0064514 | A1 * | 3/2010 | Kersteman | B23P 6/005 |
| | | | | 29/888.021 |

(Continued)

FOREIGN PATENT DOCUMENTS

| | | |
|---|---|---|
| CN | 102562178 A | 1/2012 |
| CN | 103649493 A | 3/2014 |

(Continued)

OTHER PUBLICATIONS

First Chinese Office Action for Chinese Patent Application No. 201510303237.1, dated Jun. 1, 2017, 17 pages.

*Primary Examiner* — Woody Lee, Jr.
(74) *Attorney, Agent, or Firm* — Kinney & Lange, P.A.

(57) ABSTRACT

A turbine nozzle for an air cycle machine includes a disk having a central axis and a plurality of airfoils extending from a surface of the disk. The plurality of airfoils is arranged radially about the disk section to direct a flow of a fluid passing thereby. A relief cut adjacent the airfoils, wherein the relief cut provides a channel in a least a portion of the surface of the disk.

15 Claims, 6 Drawing Sheets

(56) References Cited

U.S. PATENT DOCUMENTS

| | | |
|---|---|---|
| 2012/0114463 A1 | 5/2012 | Beers et al. |
| 2012/0156011 A1 | 6/2012 | Richardson et al. |
| 2012/0156027 A1 | 6/2012 | Merritt et al. |
| 2013/0052053 A1 | 2/2013 | Colson et al. |
| 2013/0071239 A1 | 3/2013 | Beers et al. |
| 2013/0078090 A1 | 3/2013 | Beers et al. |
| 2014/0169947 A1* | 6/2014 | Tashiro ................... F02B 37/24 415/146 |

FOREIGN PATENT DOCUMENTS

| | | | | |
|---|---|---|---|---|
| JP | 2008223569 A | * | 3/2007 | .............. F02B 37/22 |
| JP | 2008223569 A | | 9/2008 | |

* cited by examiner

US 9,873,515 B2

TURBINE NOZZLE WITH RELIEF CUT

BACKGROUND

The present invention relates to air cycle machines (ACM), such as the type used in environmental control systems (ECS) in aircraft. In particular, the present invention relates to novel dimensions of turbine nozzles used in ACMs.

ACMs may be used to compress air in a compressor section. The compressed air is discharged to a downstream heat exchanger and further routed to a turbine. The turbine extracts energy from the expanded air to drive the compressor. The air output from the turbine may be utilized as an air supply for a vehicle, such as the cabin of an aircraft.

ACMs often have a three-wheel or four-wheel configuration. In a three-wheel ACM, a turbine drives both a compressor and a fan which rotate on a common shaft. In a four-wheel ACM, two turbine sections drive a compressor and a fan on a common shaft.

Airflow must be directed into the fan section to the compressor section, away from the compressor section towards the heat exchanger, from the heat exchanger to the turbine or turbines, and from the final turbine stage out of the ACM. In at least some of these transfers, it is desirable to direct air radially with respect to the central axis of the ACM. To accomplish this, rotating nozzles may be used to generate radial in-flow and/or out-flow. Proper nozzle sizing and design is beneficial and requisite for optimal performance of the ACM.

SUMMARY

In one embodiment, a nozzle for an air cycle machine is disclosed. The nozzle has a disk section having a central axis and a diameter D1, and a plurality of airfoils extending a height D3 from a surface of the disk section. The plurality of airfoils arranged radially about the disk section. The nozzle also includes a throat width D4 defined between each radially adjacent pair of the plurality of turbine airfoils, and a channel adjacent the airfoils. The channel is defined by a depth D5 and an axial length D2.

In an alternate embodiment, a turbine nozzle for an air cycle machine includes a disk having a central axis and a plurality of airfoils extending from a surface of the disk. The plurality of airfoils is arranged radially about the disk section to direct a flow of a fluid passing thereby. A relief cut adjacent the airfoils, wherein the relief cut provides a channel in a least a portion of the surface of the disk.

Figure 1:
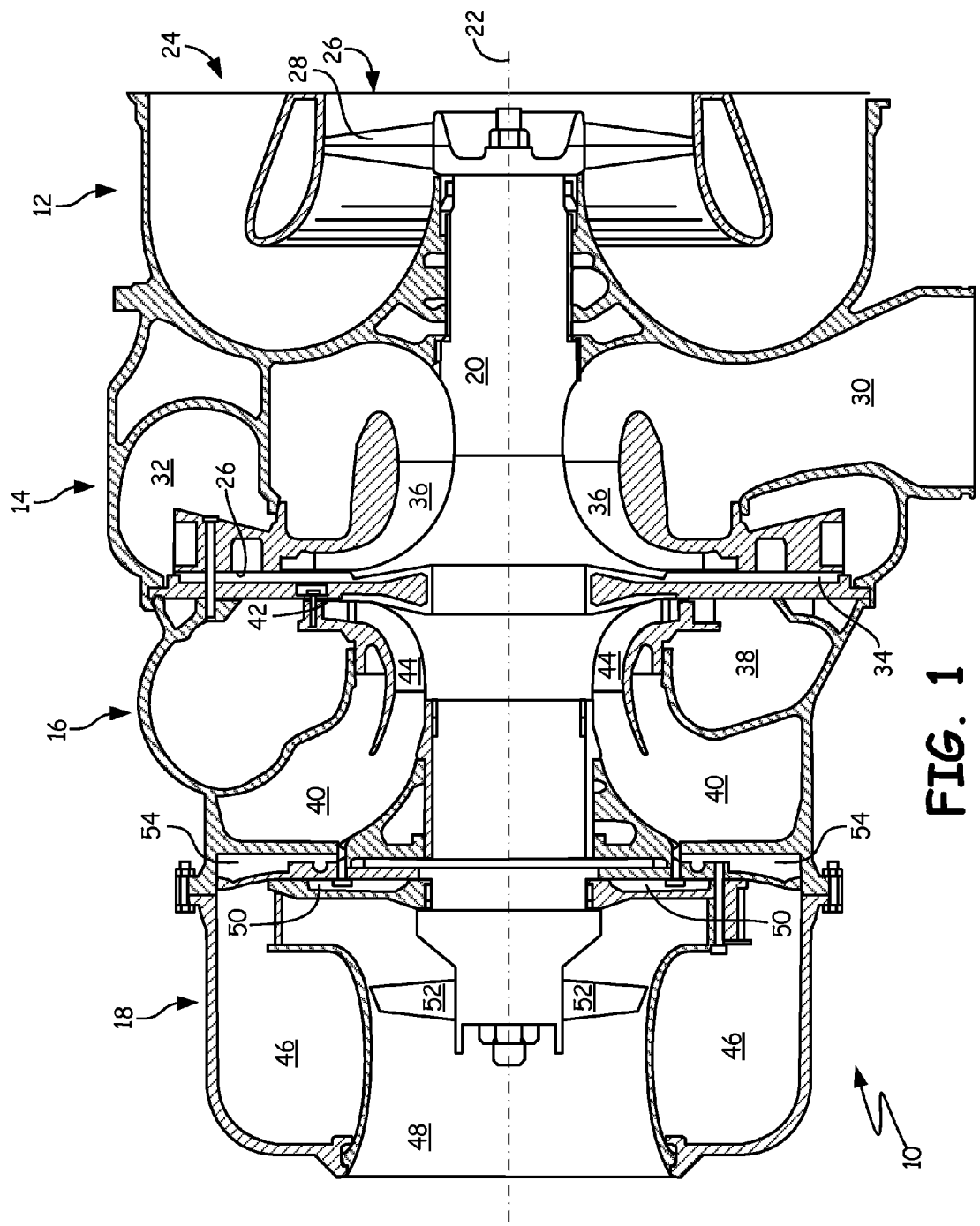
FIG. 1 is a cross-sectional view of an air cycle machine.

While the above-identified drawing figures set forth multiple embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals indicate like structures throughout the drawing figures.

DETAILED DESCRIPTION

Generally, the present embodiments provide a turbine nozzle for an air cycle machine that has an improved performance margin. By providing channels or relief cuts adjacent the airfoils of the turbine nozzle, a greater performance margin is obtained. The channels or relief cuts may be done on engine run components as part of a repair process, or may be present in a non-engine run or newly manufactured component. The channels may be sized to obtain a desired performance of the air cycle machine.

FIG. 1 is a cross-sectional view of air cycle machine (ACM) 10. ACM 10 is a four-wheel ACM, containing fan section 12, compressor section 14, first turbine section 16, and second turbine section 18, which are all connected to shaft 20. Shaft 20 rotates about central axis 22.

Fan section 12 includes fan inlet 24 and fan outlet 26. Fan inlet 24 is an opening in ACM 10 that receives working fluid from another source, such as a ram air scoop. Fan outlet 26 allows working fluid to escape fan section 12. Fan blades 28 may be used to draw working fluid into fan section 12.

Compressor section 14 includes compressor inlet 32, compressor outlet 30, compressor nozzle 34, and compressor blades 36. Compressor inlet 32 is a duct defining an aperture through which working fluid to be compressed is received from another source. Compressor outlet 30 allows working fluid to be routed to other systems after the fluid has been compressed. Compressor nozzle 34 is a nozzle section that rotates through working fluid in compressor section 14. Compressor nozzle 34 directs working fluid from compressor inlet 32 to compressor outlet 30 via compressor blades 36. Compressor nozzle 34 is a radial out-flow rotor.

First turbine section 16 includes first stage turbine inlet 38, first stage turbine outlet 40, first stage turbine nozzle 42, and first stage turbine blades 44. First stage turbine inlet 38 is a duct defining an aperture through which working fluid passes prior to expansion in first turbine section 16. First stage turbine outlet 40 is a duct defining an aperture through which working fluid (which has expanded) departs first turbine section 16. First stage turbine nozzle 42 is a nozzle section that rotates through working fluid in first turbine section 16. First stage turbine nozzle 42 cooperates with first stage turbine blades 44 to extract energy from working fluid passing therethrough, driving the rotation of first turbine section 16 and attached components, including shaft 22, fan section 12, and compressor section 14. First stage turbine nozzle 42 is a radial in-flow rotor.

Second turbine section 18 includes second stage turbine inlet 46, second stage turbine outlet 48, second stage turbine nozzle 50, and second stage turbine blades 52. Second stage turbine inlet 46 is a duct defining an aperture through which working fluid passes prior to expansion in second turbine section 18. Second stage turbine outlet 48 is a duct defining an aperture through which working fluid (which has expanded) departs second turbine section 18. Second stage turbine nozzle 50 is a nozzle section that cooperates with second stage turbine blades 52 to extract energy from working fluid passing therethrough, driving the rotation of second turbine section 18 and attached components, including shaft 20, fan section 12, and compressor section 14. In particular, second stage turbine nozzle 50 is a radial out-flow stator. Working fluid passes from second stage turbine inlet 46 to cavity 54, where it is incident upon second stage turbine nozzle 50. Working fluid then passes between nozzle blades. Turbine nozzle 50 is stationary, and the nozzle vanes guide the flow for optimum entry into the turbine rotor. The flow of fluid through second turbine section 18 causes turbine blades 52 to rotate and turn shaft 20.

Fan section 12 is connected to compressor section 14. In particular, fan outlet 26 is coupled to compressor inlet 32. Working fluid is drawn through fan inlet 24 and discharged through fan outlet 26 by fan blades 28. Working fluid from fan outlet 26 is routed to compressor inlet 32 for compression in compressor section 14. Similarly, compressor section 14 is coupled with first turbine section 16. Working fluid from compressor outlet 30 is routed to first stage turbine inlet 38.

Similarly, first turbine section 16 is coupled to second turbine section 18. Working fluid from first stage turbine outlet 40 is routed to second stage turbine inlet 46. In this way, working fluid passes through ACM 10: first through fan inlet 24, then fan outlet 26, compressor inlet 32, compressor outlet 30, first stage turbine inlet 38, first stage turbine outlet 40, second stage turbine inlet 46, and second stage turbine outlet 52. Additional stages may exist between those shown in FIG. 1. For example, often a heat exchanger (not shown) is located between compressor section 14 and first turbine section 16.

Each of fan section 12, compressor section 14, first turbine section 16, and second turbine section 18 are also connected to one another via shaft 20. Shaft 20 runs along central axis 22, and is connected to at least compressor nozzle 34, first stage turbine nozzle 42, and second stage turbine nozzle 50. Fan blades 28 may also be connected to shaft 20. Shaft 20 is a rod, such as a titanium tie-rod, used to connect other components of ACM 10. Central axis 22 is an axis with respect to which other components may be arranged.

When working fluid passes through ACM 10, the fluid is first compressed in compressor section 14, and then expanded in first turbine section 16 and second turbine section 18. Often, the working fluid is also heated or cooled in a heat exchanger (not shown) through which working fluid is routed as it passes between compressor section 14 and first turbine section 16. First turbine section 16 and second turbine section 18 extract energy from the working fluid, turning shaft 20 about central axis 22.

Working fluid passing through ACM 10 may be conditioned for use in the central cabin of a vehicle powered by a gas turbine engine. By compressing, heating, and expanding the working fluid, it may be adjusted to a desired temperature, pressure, and/or relative humidity. However, due to the rapid rotation of compressor nozzle 34, first stage turbine nozzle 42, and second stage turbine nozzle 50 with respect to the working fluid flowpath, the aforementioned components wear, and thus the parts may need frequent replacement.

Figure 2:
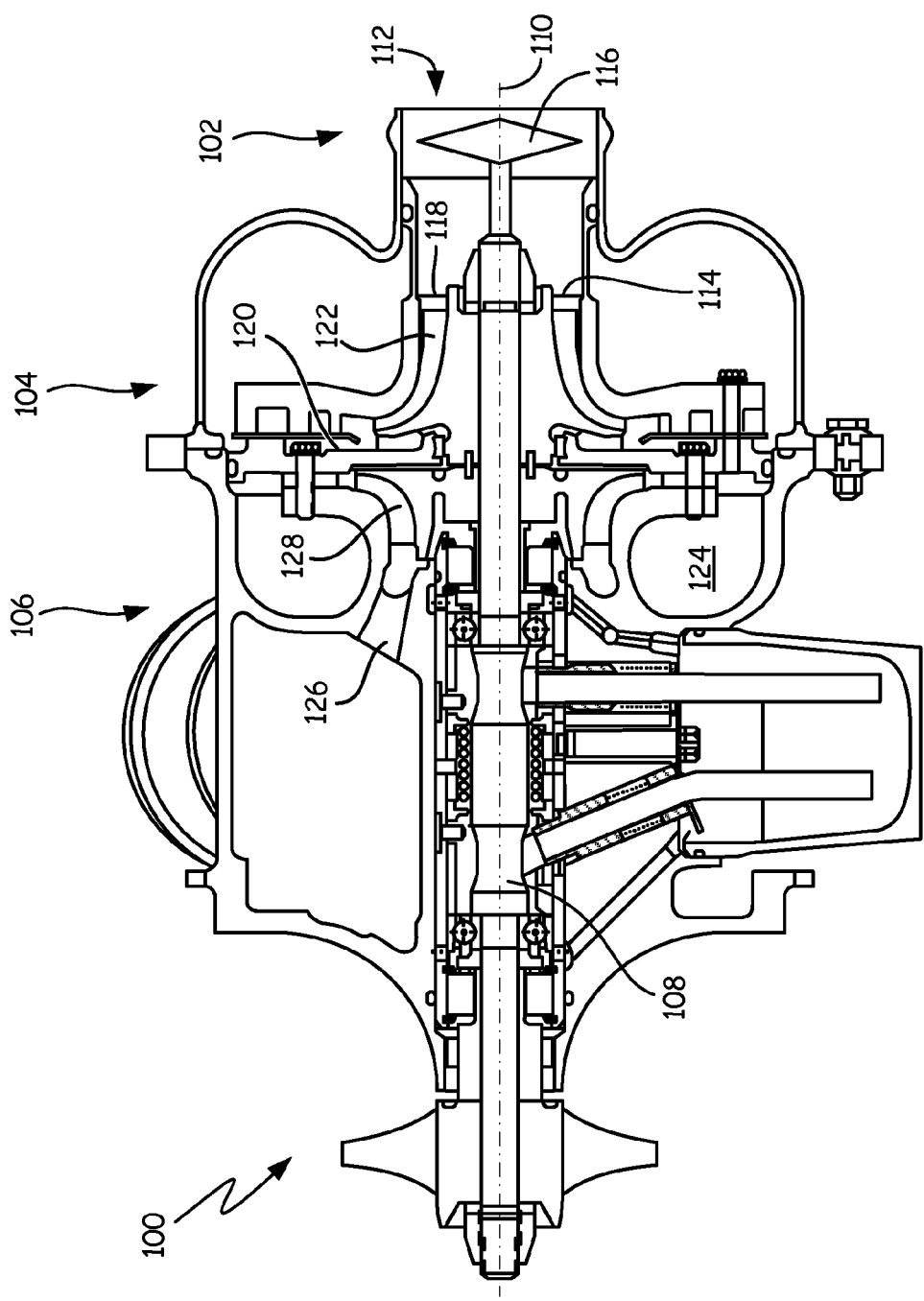
FIG. 2 is a cross-sectional view of another embodiment of an air cycle machine.

FIG. 2 is a cross-sectional view of ACM 100. ACM 100 is a three-wheel ACM, containing fan section 102, compressor section 104, and turbine section 106, all of which are connected to shaft 108. Shaft 108 rotates about central axis 110.

Fan section 102 includes fan inlet 112 and fan outlet 114. Fan inlet 112 is an opening in ACM 100 that receives working fluid from another source, such as a bleed valve in a gas turbine engine (not shown). Fan outlet 114 allows working fluid to escape fan section 102. Fan blades 116 may be used to draw working fluid into fan section 102.

Compressor section 104 includes compressor inlet 118, compressor outlet 120, and compressor nozzle 122. Compressor inlet 118 is a duct defining an aperture through which working fluid to be compressed is received from another source, such as fan section 102. Compressor outlet 120 allows working fluid to be routed to other systems once it has been compressed. Compressor nozzle 122 is a nozzle section that rotates through working fluid in compressor section 104. In particular, compressor nozzle 122 is a radial out-flow rotor.

Turbine section 106 includes turbine inlet 124, turbine outlet 126, and turbine nozzle 128. Turbine inlet 124 is a duct defining an aperture through which working fluid passes prior to expansion in turbine section 106. Turbine outlet 126 is a duct defining an aperture through which working fluid which has expanded departs turbine section 106. Turbine nozzle 128 is a nozzle section that extracts energy from working fluid passing therethrough, driving the rotation of turbine section 106 and attached components, including shaft 108, fan section 102, and compressor section 104.

Fan section 102 is connected to compressor section 104. In particular, fan outlet 114 is coupled to compressor inlet 118 such that working fluid may be transferred from fan outlet 114 to compressor inlet 118. Working fluid is drawn through fan inlet 112 and discharged through fan outlet 114 by fan blades 116. Working fluid from fan outlet 114 is routed to compressor inlet 118 for compression in compressor section 104.

Similarly, compressor section 104 is coupled with first turbine section 106. Working fluid from compressor outlet 120 is routed to turbine inlet 124. In this way, working fluid passes through ACM 100: first through fan inlet 112, then fan outlet 114, compressor inlet 118, compressor outlet 120, turbine inlet 124, and turbine outlet 126. Additional stages may exist between those shown in FIG. 1A. For example, often a heat exchanger (not shown) is located between compressor section 104 and turbine section 106.

Each of fan section 102, compressor section 104, and turbine section 106 are also connected to one another via shaft 108. Shaft 108 runs along central axis 110, and is connected to at least compressor nozzle 122 and turbine nozzle 128. Fan blades 116 may also be connected to shaft 108. Shaft 108 is a rod, such as a titanium tie-rod, used to connect other components of ACM 100. Central axis 110 is an axis with respect to which other components may be arranged.

When working fluid passes through ACM 100, it is first compressed in compressor section 104, and then expanded in turbine section 106. Often, the working fluid is also heated or cooled in a heat exchanger (not shown) through which working fluid is routed as it passes between compressor section 104 and turbine section 106. Turbine section 106 extracts energy from the working fluid, turning shaft 108 about central axis 110.

Similar to that which was described with respect to FIG. 1, working fluid passing through ACM 100 of FIG. 2 may be conditioned for use in the central cabin of a vehicle powered by a gas turbine engine. By compressing, heating, and expanding the working fluid, it may be adjusted to a desired temperature, pressure, and/or relative humidity. However, due to the rapid rotation of compressor nozzle 122 and turbine nozzle 128 with respect to the working fluid flowpath, the aforementioned components wear, and thus the parts may need frequent replacement.

Figure 3:
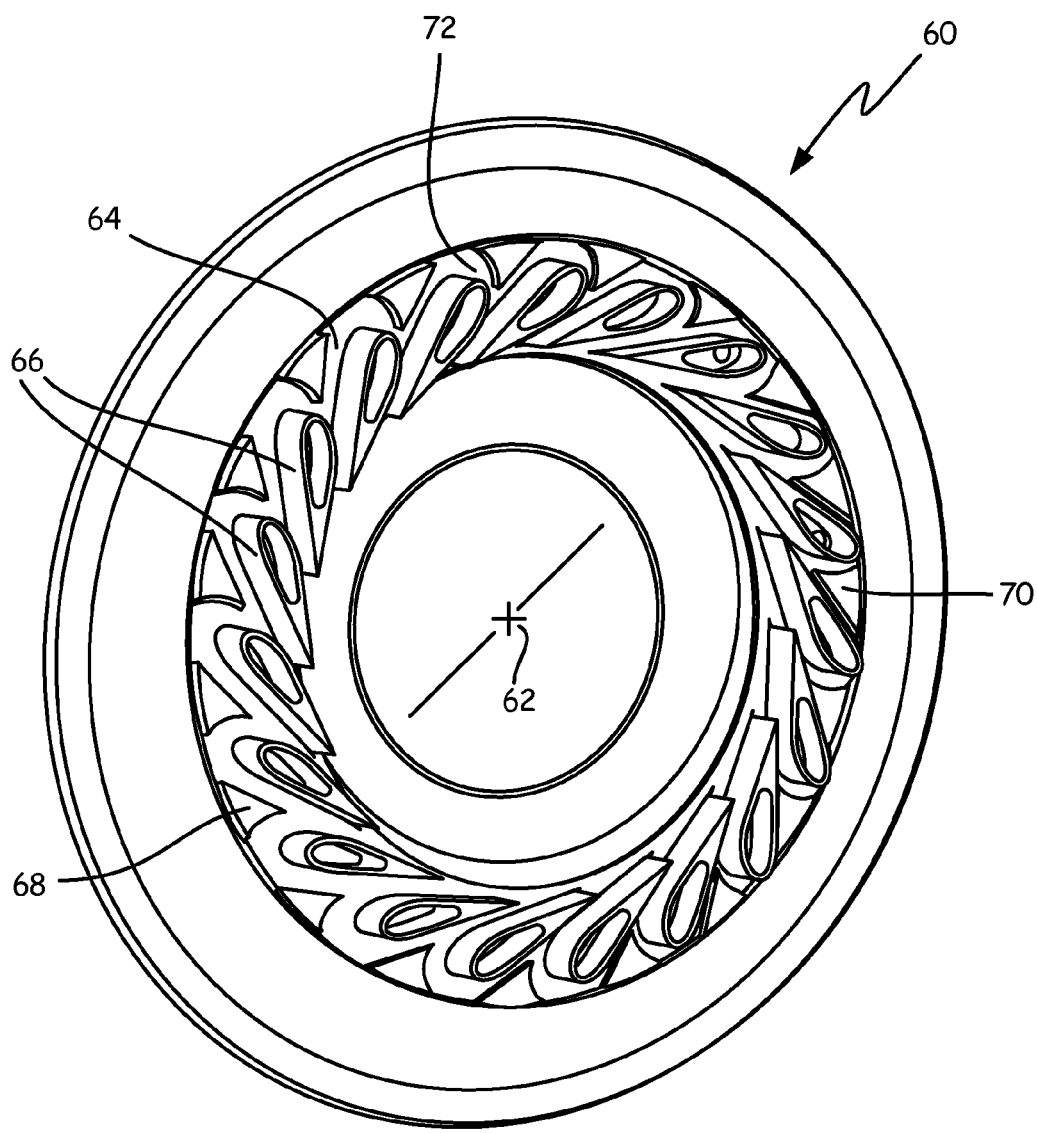
FIG. 3 is a perspective view of a turbine nozzle in the air cycle machine of FIG. 1 or 2.
Figure 4:
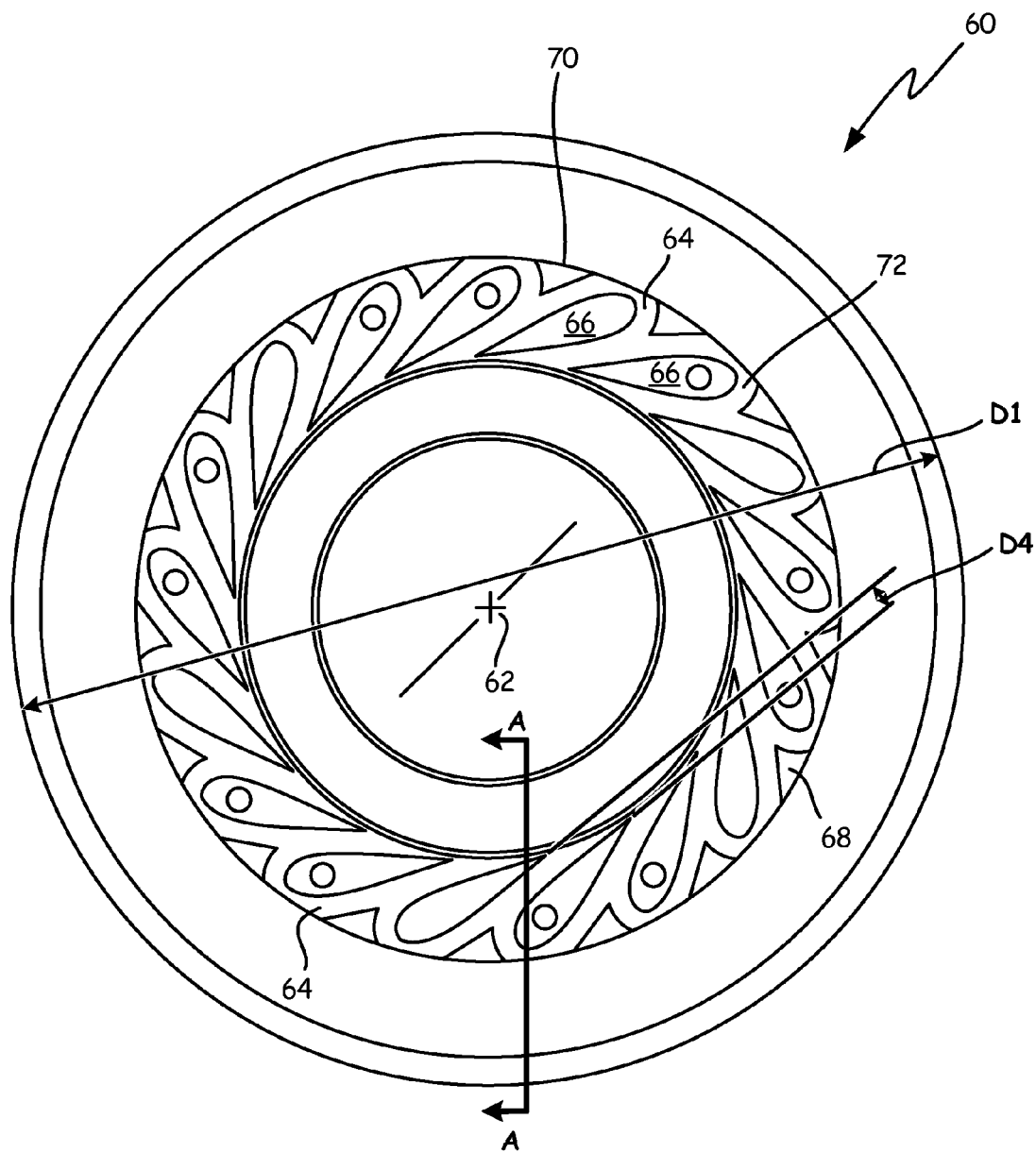
FIG. 4 is a plan view of the turbine nozzle of FIG. 3.
Figure 4A:
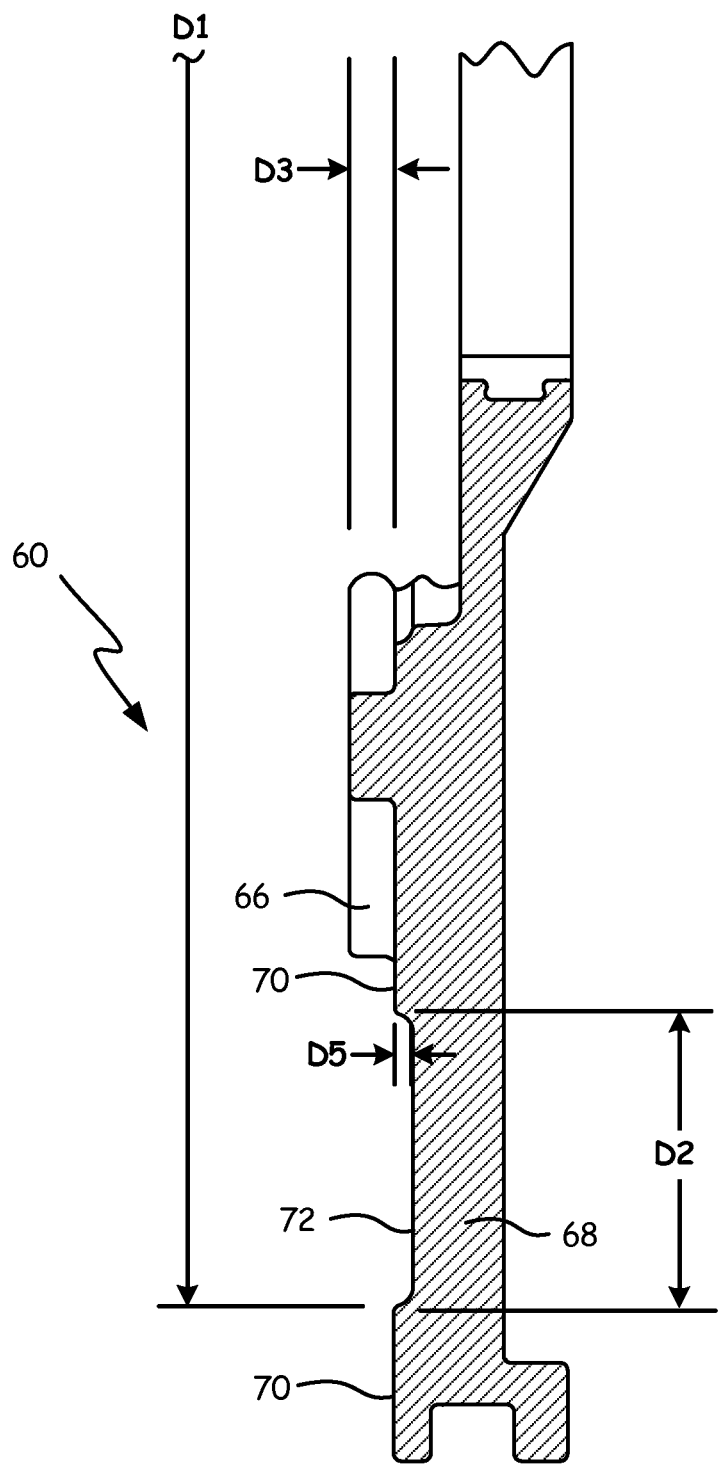
FIG. 4A is a cross-sectional view of a portion of the turbine nozzle of FIG. 3 taken along line A-A.

FIG. 3 is a perspective view of turbine nozzle 60, and FIG. 4 is a plan view of turbine nozzle 60. FIG. 4A is a cross-sectional view of turbine nozzle 60 taken alone line A-A in FIG. 3. Turbine nozzle 60 may be used as turbine nozzles 42, 50, and 128 previously described in FIGS. 1 and 2. Turbine nozzle 60 is arranged about central axis 62, which corresponds to axes 22 and 110 previously described. Turbine nozzle 60 includes a plurality of blades or airfoils 66 arranged along a surface of nozzle disk 68. Airfoils 66 and disk 68 are constructed of a durable material such as steel, aluminum, titanium or similar metal or metal alloy. Airfoils 66 are blade structures that direct the flow of air through the turbine section. Airfoils 66 may be manufactured as an integral component of disk 68. In an alternate embodiment, airfoils 66 are attached to disk 68 via fasteners 64.

Turbine nozzle 60 may contain an outer coating layer, such as tungsten carbide or similar coating known in the art. Turbine nozzle 60 is a high value component that may be relatively frequently replaced. Damage to turbine nozzle 60 may occur due to contact with abrasive particles. Thus, a high strength, durable coating may increase the service life of turbine nozzle 60.

Disk 68 is radially symmetrical about central axis 62. Airfoils 66 are spaced equidistantly from one another about the circumferential length of disk 68 on surface 70. Each airfoil 66 is also equidistant radially from central axis 62. Relief cut 72 forms a channel adjacent airfoils 66. For an engine run component, relief cut 72 is formed by typical material removal processes known in the art, such as machining. In a non-engine run or new component, relief cut 72 may be made as a feature of the forging or casting of the component, or in alternate embodiments, may be a machined feature. Relief cut 72 is located at the interface of other turned and milled or machined features. Relief cut 72 may be located on the pressure side, suction side, leading edge, and/or trailing edge. Similarly, relief cut 72 may encompass the entire throat area between adjacent airfoils 66, or only a portion thereof. Relief cut 72 may extend to the outer periphery of disk 68, or only be located for a portion thereof to create a channel structure. The coating of turbine nozzle 60 may be applied to disk 68 after the manufacturing of relief cut 72.

The location of relief cut 72 is determined by various dimensions. D1 is the diameter of the disk 68. D2 is the length of relief cut 72 in the axial direction. D3 is the height of airfoil 66. D4 is the throat width, which is a measurement of the gap between adjacent airfoils 66. D5 is the depth of relief cut 72 from the surface 70 of disk 68. Disk 68 is illustrated as containing an outer periphery ledge adjacent relief cut 72. In alternate embodiments, D2 extends to the end of the edge of disk 68.

Figure 5A:
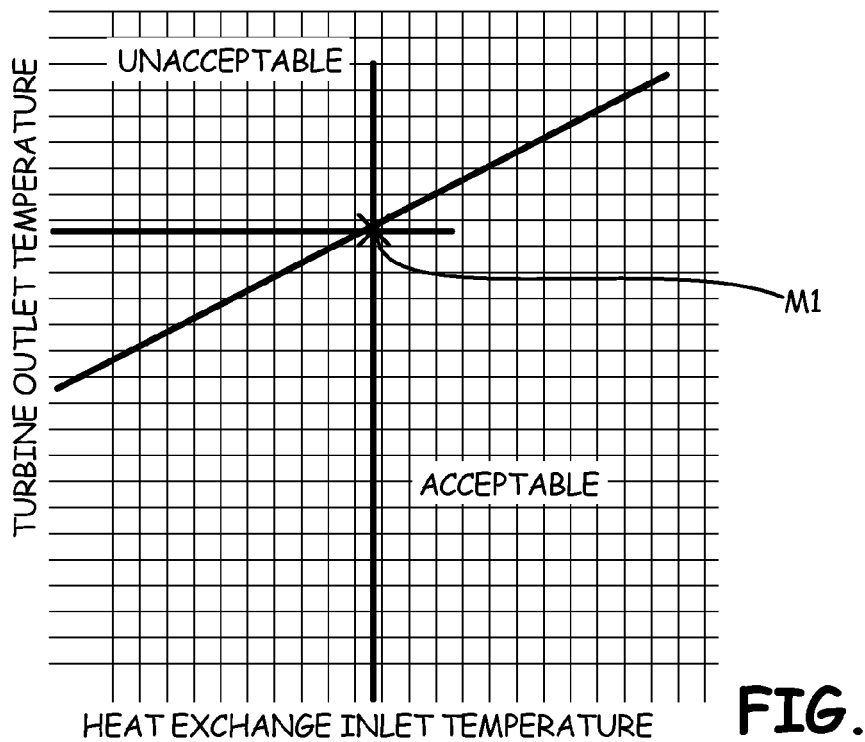
FIG. 5A is a graph illustrating the performance margin for a prior art turbine nozzle.
Figure 5B:
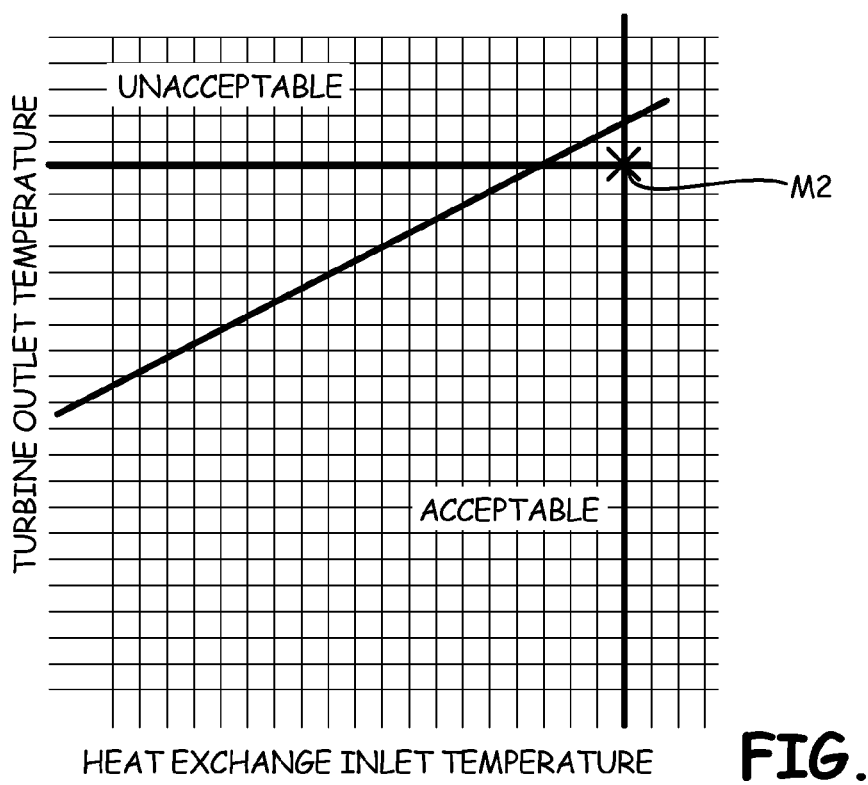
FIG. 5B is a graph illustrating the performance margin for the turbine nozzle of FIG. 2.

FIG. 5A is a graph illustrating the performance margin for a prior art turbine nozzle, while FIG. 5B is a graph illustrating the performance margin for the turbine nozzle of FIGS. 3-4A. The graphs compare the turbine outlet temperature to the heat exchanger inlet temperature for an ACM incorporating a disk with and without relief cut 72 present. Both graphs contain a sloped line that indicates a border between acceptable and unacceptable performance margins. As shown in FIG. 5A, the measured performance M1 of the prior art disk falls at a location relatively close to the border. However, the nozzle disk with the relief cut has a measured performance M2 that is further from the border, well into the "acceptable" area of the performance margin. The size and location of the relief cut 72 can be adjusted to move the location of the measured performance to a desired location within the "acceptable" area. Thus, the nozzle disk designed with the relief cut allows for greater flexibility in control of the ACM.

The tables below are several examples of disks created utilizing relief cut 72. Dimensions D1 through D5 are all in inches. Table values are shown to four decimal places. However, in view of manufacturing constraints, actual values useful for manufacture of the component are considered to be within the indicated values to determine the claimed profile of the component. That is, there are typical manufacturing tolerances which must be accounted for in the profile of the component. Accordingly, the values for the profile given in the disclosed Table are for a nominal component. It will therefore be appreciated that plus or minus typical manufacturing tolerances are applicable to the table values and that a component having a profile substantially in accordance with those values includes such tolerances. For example, a manufacturing tolerance of about +/−0.03 inches (0.76 mm) should be considered within design limits for the component. Thus, the mechanical and aerodynamic function of the components is not impaired by manufacturing imperfections and tolerances, which in different embodiments may be greater or lesser than the values set forth in the disclosed Table. As appreciated by those in the art, manufacturing tolerances may be determined to achieve a desired mean and standard deviation of manufactured components in relation to the ideal component profile points set forth in the disclosed Table.

TABLE 1

| Parameter | Min | Max |
|---|---|---|
| d1 | 4.8550 | 4.8950 |
| d2 | 0.3050 | 0.3850 |
| d3 | 0.1230 | 0.1270 |
| d4 | 0.0930 | 0.0970 |
| d5 | 0.0000 | 0.0100 |
| Ratio | | |
| d1/d2 | 12.6104 | 16.0492 |
| d1/d3 | 38.2283 | 39.7967 |
| d1/d4 | 50.0515 | 52.6344 |
| d2/d3 | 2.4016 | 3.1301 |
| d2/d4 | 3.1443 | 4.1398 |
| d3/d4 | 1.2680 | 1.3656 |

TABLE 2

| Parameter | Min | Max |
|---|---|---|
| d1 | 4.8550 | 4.8950 |
| d2 | 0.3050 | 0.3850 |
| d3 | 0.1530 | 0.1570 |
| d4 | 0.0930 | 0.0970 |
| d5 | 0.0000 | 0.0100 |
| Ratio | | |
| d1/d2 | 12.6104 | 16.0492 |
| d1/d3 | 30.9236 | 31.9935 |
| d1/d4 | 50.0515 | 52.6344 |
| d2/d3 | 1.9427 | 2.5163 |
| d2/d4 | 3.1443 | 4.1398 |
| d3/d4 | 1.5773 | 1.6882 |

TABLE 3

| Parameter | Min | Max |
|---|---|---|
| d1 | 5.3600 | 5.4200 |
| d2 | 0.0000 | 0.0000 |
| d3 | 0.2430 | 0.2470 |
| d4 | 0.1272 | 0.1332 |
| d5 | 0.0000 | 0.0100 |
| Ratio | | |
| d1/d2 | ~ | ~ |
| d1/d3 | 21.7004 | 22.3045 |
| d1/d4 | 40.2402 | 42.6101 |
| d2/d3 | ~ | ~ |
| d2/d4 | ~ | ~ |
| d3/d4 | 1.8243 | 1.9418 |

TABLE 4

| Parameter | Min | Max |
|---|---|---|
| d1 | 5.3600 | 5.4200 |
| d2 | 0.0000 | 0.0000 |
| d3 | 0.2190 | 0.2230 |
| d4 | 0.1140 | 0.1200 |
| d5 | 0.0000 | 0.0100 |
| Ratio | | |
| d1/d2 | ~ | ~ |
| d1/d3 | 24.0359 | 24.7489 |
| d1/d4 | 44.6667 | 47.5439 |
| d2/d3 | ~ | ~ |
| d2/d4 | ~ | ~ |
| d3/d4 | 1.8250 | 1.9561 |

TABLE 5

| Parameter | Min | Max |
|---|---|---|
| d1 | 4.8550 | 4.8950 |
| d2 | 0.3050 | 0.3850 |
| d3 | 0.0670 | 0.0710 |
| d4 | 0.0880 | 0.0920 |
| d5 | 0.0000 | 0.0100 |
| Ratio | | |
| d1/d2 | 12.6104 | 16.0492 |
| d1/d3 | 68.3803 | 73.0597 |
| d1/d4 | 52.7717 | 55.6250 |
| d2/d3 | 4.2958 | 5.7463 |
| d2/d4 | 3.3152 | 4.3750 |
| d3/d4 | 0.7283 | 0.8068 |

TABLE 6

| Parameter | Min | Max |
|---|---|---|
| d1 | 4.8550 | 4.8950 |
| d2 | 0.3050 | 0.3850 |
| d3 | 0.0670 | 0.0710 |
| d4 | 0.1050 | 0.1090 |
| d5 | 0.0000 | 0.0100 |
| Ratio | | |
| d1/d2 | 12.6104 | 16.0492 |
| d1/d3 | 68.3803 | 73.0597 |
| d1/d4 | 44.5413 | 46.6190 |
| d2/d3 | 4.2958 | 5.7463 |
| d2/d4 | 2.7982 | 3.6667 |
| d3/d4 | 0.6147 | 0.6762 |

TABLE 7

| Parameter | Min | Max |
|---|---|---|
| d1 | 4.8350 | 4.9150 |
| d2 | 0.3450 | 0.4250 |
| d3 | 0.0920 | 0.0960 |
| d4 | 0.1072 | 0.1112 |
| d5 | 0.0000 | 0.0100 |
| Ratio | | |
| d1/d2 | 11.3765 | 14.2464 |
| d1/d3 | 50.3646 | 53.4239 |
| d1/d4 | 43.4802 | 45.8489 |
| d2/d3 | 3.5938 | 4.6196 |
| d2/d4 | 3.1025 | 3.9646 |
| d3/d4 | 0.8273 | 0.8955 |

TABLE 8

| Parameter | Min | Max |
|---|---|---|
| d1 | 5.3600 | 5.4350 |
| d2 | 0.0000 | 0.0000 |
| d3 | 0.0920 | 0.0960 |
| d4 | 0.1540 | 0.1580 |
| d5 | 0.0000 | 0.0100 |
| Ratio | | |
| d1/d2 | ~ | ~ |
| d1/d3 | 58.8333 | 59.0761 |
| d1/d4 | 33.9241 | 35.2922 |
| d2/d3 | ~ | ~ |
| d2/d4 | ~ | ~ |
| d3/d4 | 0.5823 | 0.6234 |

TABLE 9

| Parameter | Min | Max |
|---|---|---|
| d1 | 5.3600 | 5.4050 |
| d2 | 0.0000 | 0.0000 |
| d3 | 0.0920 | 0.0960 |
| d4 | 0.1830 | 0.1870 |
| d5 | 0.0000 | 0.0100 |
| Ratio | | |
| d1/d2 | ~ | ~ |
| d1/d3 | 55.8333 | 58.7500 |
| d1/d4 | 28.6631 | 29.5355 |
| d2/d3 | ~ | ~ |
| d2/d4 | ~ | ~ |
| d3/d4 | 0.4920 | 0.5246 |

Discussion of Possible Embodiments

The following are non-exclusive descriptions of possible embodiments of the present invention.

In one embodiment, a nozzle for an air cycle machine is disclosed. The nozzle has a disk section having a central axis and a diameter D1, and a plurality of airfoils extending a height D3 from a surface of the disk section. The plurality of airfoils arranged radially about the disk section. The nozzle also includes a throat width D4 defined between each radially adjacent pair of the plurality of turbine airfoils, and a channel adjacent the airfoils. The channel is defined by a depth D5 and an axial length D2.

The nozzle of the preceding paragraph can optionally include, additionally and/or alternatively, any one or more of the following features, configurations and/or additional components:

wherein ratio of D1/D2 is between 11.37 and 16.05;
wherein ratio of D1/D3 is between 21.70 and 73.06;
wherein ratio of D1/D4 is between 28.66 and 52.64;
wherein ratio of D2/D3 is between 1.94 and 5.75;
wherein ratio of D2/D4 is between 2.79 and 4.38;
wherein ratio of D3/D4 is between 0.49 and 1.96;
wherein D5 has a maximum depth of 0.01 inches;

An air cycle machine comprising a fan section, a compressor section in fluid communication with the fan section, at least one turbine section in fluid communication with the compressor section, and wherein the turbine section includes the aforementioned nozzle;

wherein the air cycle machine is a three wheel air cycle machine;

wherein the air cycle machine is a four wheel air cycle machine; and/or wherein the channel extends to an outer periphery of the disk.

In an alternate embodiment, a turbine nozzle for an air cycle machine includes a disk having a central axis and a plurality of airfoils extending from a surface of the disk. The plurality of airfoils is arranged radially about the disk section to direct a flow of a fluid passing thereby. A relief cut adjacent the airfoils, wherein the relief cut provides a channel in a least a portion of the surface of the disk.

The turbine nozzle of the preceding paragraph can optionally include, additionally and/or alternatively, any one or more of the following features, configurations and/or additional components:

wherein the relief cut has a depth no greater than 0.01 inches; and/or wherein the relief cut extends to an outer periphery of the turbine disk.

Any relative terms or terms of degree used herein, such as "generally", "substantially", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A nozzle comprising:
a disk section having a central axis and a diameter D1;
a plurality of turbine airfoils directly extending a height D3 from a surface of the disk section, the plurality of airfoils arranged radially about the disk section and forming a portion of a working fluid flow path with the surface of the disk section;
a throat width D4 defined between each radially adjacent pair of the plurality of turbine airfoils;
a channel in at least a portion of the surface of the disk section, the channel adjacent the airfoils, wherein the channel is of a depth D5 and an axial length D2; and
wherein the nozzle is configured as a turbine nozzle for an air cycle machine.

2. The nozzle of claim 1 wherein ratio of D1/D2 is between 11.37 and 16.05.

3. The nozzle of claim 1 wherein ratio of D1/D3 is between 21.70 and 73.06.

4. The nozzle of claim 1 wherein ratio of D1/D4 is between 28.66 and 52.64.

5. The nozzle of claim 1 wherein ratio of D2/D3 is between 1.94 and 5.75.

6. The nozzle of claim 1 wherein ratio of D2/D4 is between 2.79 and 4.38.

7. The nozzle of claim 1 wherein ratio of D3/D4 is between 0.49 and 1.96.

8. The nozzle of claim 1 wherein D5 has a maximum depth of 0.01 inches.

9. An air cycle machine comprising:
a fan section;
a compressor section in fluid communication with the fan section;
at least one turbine section in fluid communication with the compressor section;
wherein the turbine section includes the nozzle of claim 1.

10. The air cycle machine of claim 9 wherein the air cycle machine is a three wheel air cycle machine.

11. The air cycle machine of claim 9 wherein the air cycle machine is a four wheel air cycle machine.

12. The air cycle machine of claim 9 wherein the channel extends to an outer periphery of the disk.

13. A turbine nozzle comprising:
a disk having a central axis;
a plurality of airfoils directly extending from a surface of the disk, the plurality of airfoils arranged radially about the disk section to direct a flow of a fluid passing thereby;
a relief cut adjacent the airfoils, wherein the relief cut provides a channel in a least a portion of the surface of the disk; and wherein the turbine nozzle is configured to direct fluid to turbine blades of an air cycle machine.

14. The turbine nozzle of claim 13 wherein the relief cut has a depth no greater than 0.01 inches.

15. The turbine nozzle of claim 13 wherein the relief cut extends to an outer periphery of the turbine disk.

* * * * *